United States Patent
Xu et al.

(10) Patent No.: US 9,693,255 B2
(45) Date of Patent: Jun. 27, 2017

(54) METHOD AND APPARATUS FOR REPORTING TRAFFIC AND METHOD AND APPARATUS FOR COUNTING NETWORK TRAFFIC

(71) Applicant: ZTE Corporation, Shenzhen (CN)

(72) Inventors: Lin Xu, Shenzhen (CN); Guoteng Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/443,447

(22) PCT Filed: Aug. 9, 2013

(86) PCT No.: PCT/CN2013/081209
§ 371 (c)(1),
(2) Date: May 18, 2015

(87) PCT Pub. No.: WO2014/086169
PCT Pub. Date: Jun. 12, 2014

(65) Prior Publication Data
US 2016/0212648 A1    Jul. 21, 2016

(30) Foreign Application Priority Data

Dec. 5, 2012   (CN) .......................... 2012 1 0516135

(51) Int. Cl.
*H04W 4/26* (2009.01)
*H04W 24/10* (2009.01)
(Continued)

(52) U.S. Cl.
CPC ......... *H04W 24/10* (2013.01); *H04L 12/1435* (2013.01); *H04L 43/0882* (2013.01); *H04W 24/04* (2013.01); *H04W 24/08* (2013.01)

(58) Field of Classification Search
CPC .............. H04L 63/0236; H04L 63/164; H04L 63/1441; H04L 61/0227; H04L 41/044;
(Continued)

(56) References Cited

U.S. PATENT DOCUMENTS

2015/0139185 A1*   5/2015   Zhang ................... H04W 36/24
370/331

FOREIGN PATENT DOCUMENTS

CN        101867946 A     10/2010
CN        101873640 A     10/2010
(Continued)

OTHER PUBLICATIONS

International Search Report for corresponding application PCT/CN2013/081209 filed Aug. 9, 2013; Mail date Nov. 21, 2013.
(Continued)

*Primary Examiner* — Phuoc H Doan
(74) *Attorney, Agent, or Firm* — Cantor Colburn LLP

(57) ABSTRACT

Provided are a method and an apparatus for reporting traffic and a method and an apparatus for counting network traffic. The method for reporting the traffic includes: an application acquires network traffic of the application (S102); and the application reports the network traffic (S104). Through the technical solution, the problem that the operator cannot master the traffic demands of application of a user side in different periods so that they cannot carry out operation and management according to the traffic use condition of application of the user side is solved. The operator can master the traffic use condition of application of the user side according to the network traffic reported by the application so as to operate and manage the network traffic according to the traffic use condition of the user, thereby improving the monitoring of the network traffic.

10 Claims, 4 Drawing Sheets

(51) Int. Cl.
*H04W 24/08* (2009.01)
*H04W 24/04* (2009.01)
*H04L 12/14* (2006.01)
*H04L 12/26* (2006.01)

(58) Field of Classification Search
CPC ... H04L 41/0896; H04L 43/045; H04W 36/24
USPC ..... 455/450, 456.1; 370/395.31, 395.53, 235
See application file for complete search history.

(56) References Cited

FOREIGN PATENT DOCUMENTS

| | | |
|---|---|---|
| CN | 102026141 A | 4/2011 |
| CN | 102711139 A | 10/2012 |
| EP | 2395811 A2 | 12/2011 |
| WO | 2008003337 A1 | 1/2008 |

OTHER PUBLICATIONS

Supplemental Partial European Search Report No. EP13860101 Dated Jun. 20, 2016; pp. 4.

\* cited by examiner

METHOD AND APPARATUS FOR REPORTING TRAFFIC AND METHOD AND APPARATUS FOR COUNTING NETWORK TRAFFIC

TECHNICAL FIELD

The present disclosure relates to the field of communications, in particular to a method and an apparatus for reporting traffic and a method and an apparatus for counting network traffic.

BACKGROUND

Since the emergence of 3G era, the mobile internet is developed at a tremendous speed in the communication network with the growth spurts of the 3G/4G and the popularization of the intelligent mobile phone. Accordingly, the rapid increase of traffic exceeds the expectation of the operator substantially. However, the limited mobile spectrum resources are occupied a lot to only bring small economic benefits.

In another aspect, for both the mobile and fixed networks, the voice communication market has become saturated now, and such value-added services based on the voice communication as Short Messaging Service (SMS) and polyphonic ringtone have shown a declining trend. Whereas, due to the development of the internet business, the data service traffic of the telecom operator gets a huge jump, accordingly, the traffic has become the most valuable growth point of the operator.

However, in this transition process, many problems have been exposed to the operators, resulting in bottleneck in networking, charging, terminal and service. The operator cannot master the traffic demands of application of a user side in different periods so that they cannot carry out operation and management according to the traffic use condition of application of the user side.

SUMMARY

The embodiments of the present disclosure provide a method and an apparatus for reporting traffic and a method and an apparatus for counting network traffic, in order to at least solve the problem that an operator cannot master the traffic demands of application of a user side in different periods so that they cannot carry out operation and management according to the traffic use condition of application of the user side in the related arts.

In one aspect, an embodiment of the present disclosure provides a method for reporting traffic, including: an application acquires network traffic of the application; and the application reports the network traffic.

In an example embodiment, the step that the application acquires the network traffic of the application includes: the application acquires the network traffic of the application according to a network type.

In an example embodiment, the step that the application acquires the network traffic of the application includes: a plug-in embedded in the application acquires the network traffic of the application according to a network type, wherein the plug-in is a plug-in embedded in the application by a website releasing the application.

In an example embodiment, the step that the application acquires network traffic of the application includes: the network traffic of the application is acquired according to a first predetermined time; and the network traffic of the application in different networks is counted according to a predetermined policy.

In an example embodiment, the step that the network traffic of the application is acquired according to the first predetermined time includes: when the application is started, the network traffic passing through a terminal is read according to the first predetermined time, wherein the network traffic at least includes one of the following: total bytes received/sent through connection, total data packets received/sent through connection, total bytes received/sent, total data packets received/sent and total bytes received/sent for acquiring a network User Identifier (UID).

In an example embodiment, the network type at least includes one of the following: Wireless Local Area Network (WLAN), mobile cellular network, Long Term Evolution (LTE) and Long Term Evolution-Advanced (LTE-A).

In an example embodiment, the step that the application reports the network traffic includes: the counted network traffic is reported according to a second predetermined time, wherein the counted network traffic at least carries the following information: International Mobile Subscriber Identifier (IMSI), application identifier (ID) information of the application, and data traffic corresponding to different networks.

In another aspect, an embodiment of the present disclosure provides a method for counting network traffic, including: a website acquires an application Identifier (ID) of an application; the website embeds a plug-in and the application ID into the application, wherein the plug-in is configured to acquire the network traffic of the application; the website provides to a user the application into which the plug-in and the application ID are embedded; and the website receives the network traffic of the application reported by the plug-in.

In an example embodiment, before the website receives the network traffic of the application reported by the plug-in, the method further includes: the plug-in acquires the network traffic of the application according to a network type.

In an example embodiment, the step that the plug-in acquires the network traffic of the application according to the network type includes: the plug-in acquires the network traffic of the application according to a first predetermined time; and the network traffic of the application in different networks is counted according to a predetermined policy.

In another aspect, an embodiment of the present disclosure further provides an apparatus for reporting traffic, including, a first acquisition component, which is configured to acquire network traffic of an application, and a reporting component, which is configured to report the network traffic.

In an example embodiment, the first acquisition component includes: an acquisition element, which is configured to acquire the network traffic of the application according to a first predetermined time, and a counting element, which is configured to count the network traffic of the application in different networks according to a predetermined policy.

In another aspect, an embodiment of the present disclosure provides an apparatus for counting network traffic, including: a second acquisition component, which is configured to acquire an application ID of an application, an embedding component, which is configured to embed a plug-in and the application ID into the application, wherein the plug-in is configured to acquire network traffic of the application, a presentation component, which is configured to provide to a user the application into which the plug-in and the application ID are embedded, and a receiving component, which is configured to receive the network traffic of the application reported by the plug-in.

The embodiments of the present disclosure adopt the following method: the application acquires network traffic of the application and reports the acquired network traffic. Through the embodiments of the present disclosure, the problem that the operator cannot master the traffic demands of application of a user side in different periods so that they cannot carry out operation and management according to the traffic use condition of application of the user side is solved. The operator can master the traffic use condition of application of the user side according to the network traffic reported by the application so as to operate and manage the network traffic according to the traffic use condition of the user, thereby improving the monitoring of the network traffic.

BRIEF DESCRIPTION OF THE DRAWINGS

The drawings illustrated here are to provide further understanding of the present disclosure and constitute one part of the application, and the exemplary embodiments of the present disclosure and the explanations thereof are intended to explain the present disclosure, instead of improperly limiting the present disclosure. In the drawings.

DETAILED DESCRIPTION OF THE EMBODIMENTS

The present disclosure will be described below with reference to the drawings and embodiments in detail. It should be noted that, in case of no conflict, the embodiments of the application and features therein can be combined with each other.

Figure 1:
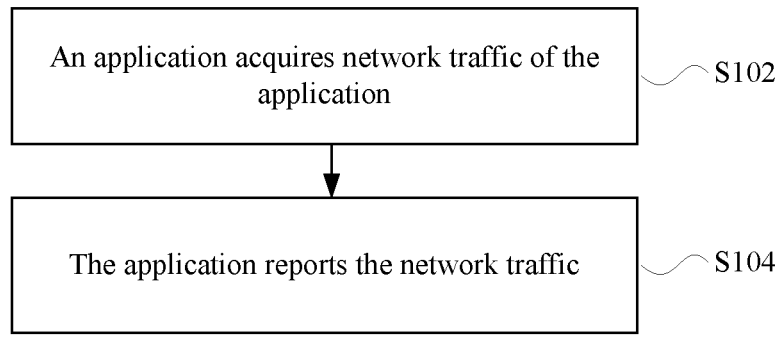
FIG. 1 is a flowchart of a method for reporting traffic according to an embodiment of the present disclosure.

In order to solve the problem that the operator cannot master the traffic demands of application of a user side in different periods so that they cannot carry out operation and management according to the traffic use condition of application of the user side, an embodiment of the present disclosure provides a method for reporting traffic. As shown in FIG. 1, the flow of the method for reporting traffic includes Steps S102 to S104.

Step S102: An application acquires network traffic of the application.

Step S104: The application reports the network traffic.

This embodiment adopts the following method: the application acquires network traffic of the application and reports the acquired network traffic. Through this embodiment of the present disclosure, the problem that the operator cannot master the traffic demands of application of a user side in different periods so that they cannot carry out operation and management according to the traffic use condition of application of the user side is solved. The operator can master the traffic use condition of application of the user side according to the network traffic reported by the application so as to operate and manage the network traffic according to the traffic use condition of the user, thereby improving the monitoring of the network traffic.

When acquiring the network traffic of the application, the application may acquire the network traffic of the application according to a network type. In an example embodiment, the application may be different from a common one in that this application is embedded with a plug-in for acquiring the network traffic. During implementation, the plug-in in the application acquires the network traffic of the application according to a network type, wherein the plug-in is one embedded in the application by a website releasing the application.

When being started, the application may acquire its own data traffic according to a first predetermined time and count the data traffic of the application in different networks according to a predetermined policy. The network type may include at least one of the following: WLAN, mobile cellular network, LTE and LTE-A. The data traffic may include at least one of the following: total bytes received/sent through connection, total data packets received/sent through connection, total bytes received/sent, total data packets received/sent and total bytes received/sent for acquiring a network UID.

During implementation, the predetermined policy may be the information of a time period or the information of the specific network type of which the network traffic is to be reported and the like. For example, the network traffic of a mobile cellular network may be acquired according to the information of the time period, for example, the network traffic of the mobile cellular network can be counted and reported every 10 minutes at 17:00-20:00.

After the network traffic of the application is acquired, the application reports the network traffic. In an example embodiment, it is the plug-in in the application which reports the network traffic, and the counted network traffic may be reported according to a second predetermined time, wherein the counted network traffic may at least carry the following information: IMSI, application ID information of the application and data traffic corresponding to different networks. The second predetermined time used in this process may be the same as or different from the first predetermined time.

Figure 2:
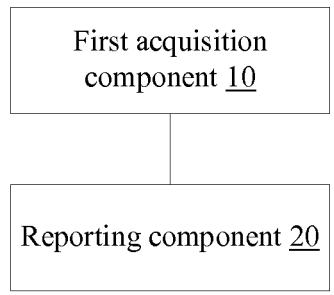
FIG. 2 is a block diagram showing the structure of an apparatus for reporting traffic according to an embodiment of the present disclosure.

An embodiment of the present disclosure further provides an apparatus which can be applied for implementing the method for reporting traffic. The block diagram showing the structure of the apparatus for reporting traffic is as shown in FIG. 2, including: a first acquisition component 10, which is configured to acquire network traffic of an application, and a reporting component 20, which is coupled with the first acquisition component 10 and is configured to report the network traffic.

Figure 3:
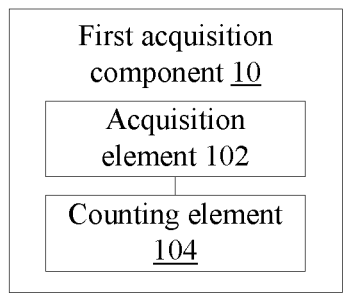
FIG. 3 is a block diagram showing the structure of a first acquisition component of an apparatus for reporting traffic according to an embodiment of the present disclosure.

FIG. 3 further shows the block diagram showing the structure of the first acquisition component 10. The first acquisition component 10 may include: an acquisition element 102, which is configured to acquire the data traffic of the application according to a first determined time, and a counting element 104, which is coupled with the acquisition element 102 and is configured to count the data traffic of the application in different networks according to a predetermined policy.

Figure 4:
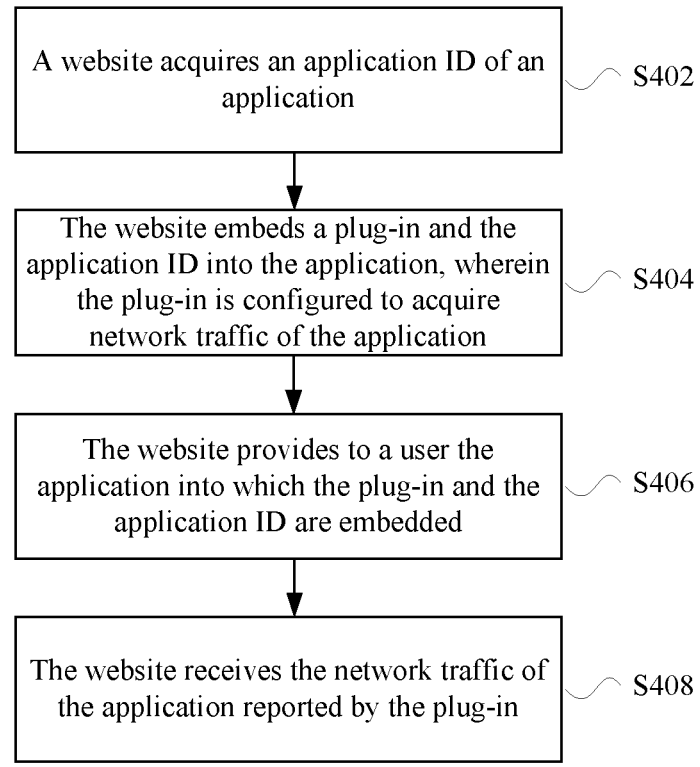
FIG. 4 is a flowchart of a method for counting network traffic according to an embodiment of the present disclosure.

An embodiment of the present disclosure further provides a method for counting network traffic. As shown in FIG. 4, the flow of the method for counting network traffic includes Steps S402 to S408.

Step S402: A website acquires an application ID of an application.

Step S404: The website embeds a plug-in and the application ID into the application, wherein the plug-in is configured to acquire network traffic of the application.

Step S406: The website provides to a user the application into which the plug-in and the application ID are embedded.

Step S408: The website receives the network traffic of the application reported by the plug-in.

In the implementation process of the method, before the website receives the network traffic of the application reported by the plug-in, the plug-in of application of a user side acquires the network traffic of the application according to a network type. The way for acquiring the network traffic is similar to that used in the method for reporting the traffic, namely, the plug-in acquires the data traffic of the application according to the first predetermined time; and the data traffic of the application in different networks is counted according to the predetermined policy.

Figure 5:
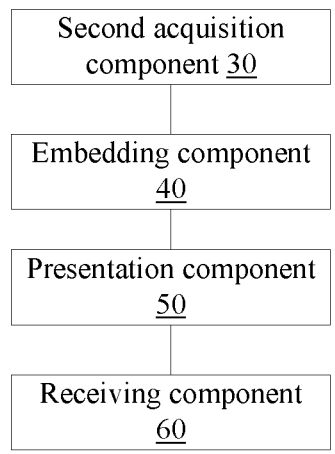
FIG. 5 is a block diagram showing the structure of an apparatus for counting network traffic according to an embodiment of the present disclosure.

Based on the method for counting the network traffic, an embodiment of the present disclosure further provides an apparatus for counting network traffic, which can be applied for implementing the method for counting the network traffic. The block diagram showing the structure of the apparatus is as shown in FIG. 5, including: a second acquisition component 30, which is configured to acquire an application ID of the application, an embedding component 40, which is coupled with the second acquisition component 30 and is configured to embed the plug-in and application ID into the application, wherein the plug-in is configured to acquire the network traffic of the application, a presentation component 50, which is coupled with the embedding component 40 and is configured to provide to a user the application into which the plug-in and the application ID are embedded, and a receiving component 60, which is coupled with the presentation component 50 and is configured to receive the network traffic of the application reported by the plug-in.

Through the embodiments of the present disclosure, the real value of data traffic can be restored, and the data traffic of application of the user side can be monitored and managed, so that the integrated innovation is speeded up and the operator gets the opportunity of mastering the traffic.

The methods of the embodiment are described below in conjunction with example embodiments. In the following example embodiments, when an apparatus is involved, the names of the components may be slightly different from that in the embodiments above, but the apparatus can realize the same function as the embodiments above in general.

First Example Embodiment

The example embodiment provides a method and a system for reporting traffic of a terminal application by a plug-in. In this example embodiment, in order to solve the technical problem that an operator cannot obtain the network traffic use condition of application of a user side so that they cannot carry out management according to the traffic condition of application of the user side in the related arts, the following technical scheme is adopted.

A method for reporting and counting the traffic of application of a terminal side by a plug-in includes: an application provider acquires a traffic counting plug-in at first; the provider provides an application to a website to obtain an application ID; and then the application provider acquires the traffic plug-in and related help documents from an internet website in which the application will be released, wherein the traffic plug-in may be a development package provided by the website.

An application developer adds the plug-in, the application ID and related documents to the application, and then uploads again the application into which the plug-in is embedded. When the traffic is reported, the development package reports the traffic data to a server side (i.e., the operator side).

An embodiment of the present disclosure further provides a system for reporting and counting the traffic of application of a terminal by a plug-in, including: a traffic plug-in element, which is configured to acquire the traffic of the application, wherein the traffic plug-in element transmits the traffic according to a transmission policy; an internet website element, which is configured to receive the application provided or uploaded by a provider and release the application in an internet website for the download and use of a user; and a counting element, which is configured to provide a function of querying and counting the traffic.

Through the method and the system for counting the traffic in this example embodiment, the traffic of the application is reported by the plug-in so that the traffic of the application is counted precisely and is operated rationally and effectively.

Second Example Embodiment

Figure 6:
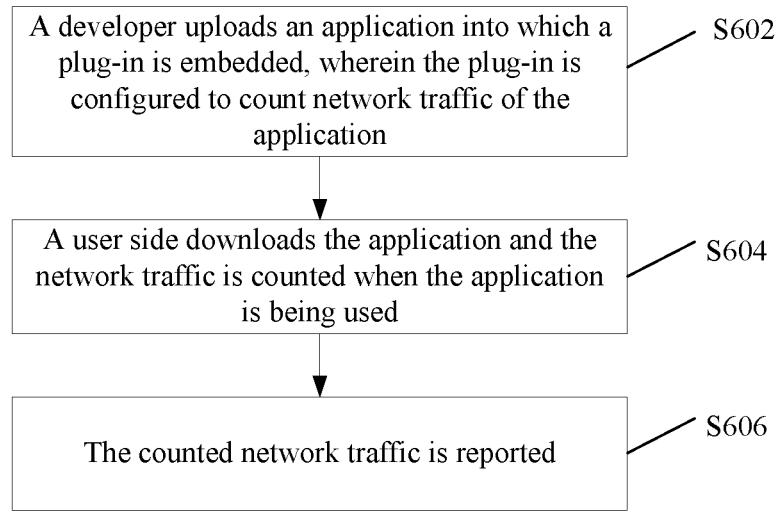
FIG. 6 is a flowchart of a method for reporting and counting the traffic of an application by a plug-in according to the second example embodiment of the present disclosure.

This example embodiment provides a method for reporting and counting the traffic of application of a terminal, which is applied in a network system. As shown in FIG. 6, the method includes Steps S602 to S606.

Step S602: A developer uploads an application into which a plug-in is embedded, wherein the plug-in is configured to count the network traffic of the application.

Figure 7:
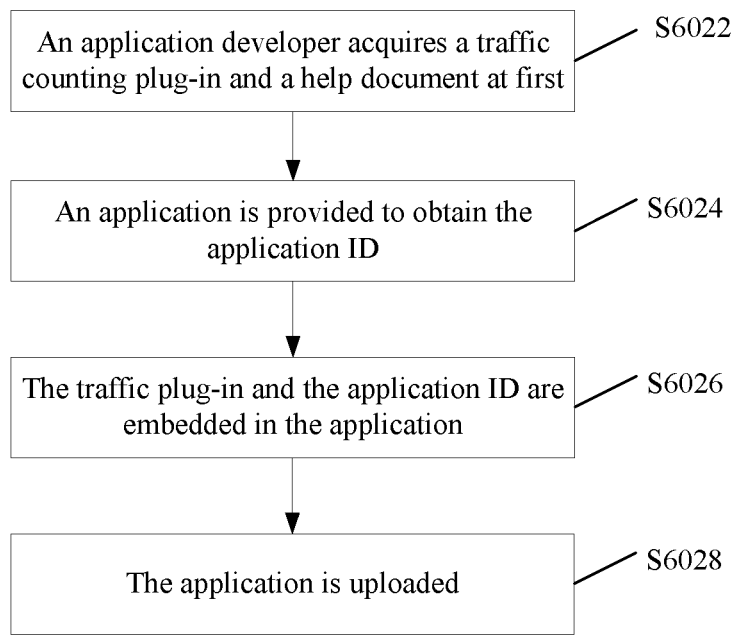
FIG. 7 is flowchart 1 showing the steps of a method for reporting and counting the traffic of an application by a plug-in according to the second example embodiment of the present disclosure.

In the implementation process of Step S602, the following flow may also be executed, as shown in FIG. 7, including Steps S6022 to S6028.

Step S6022: An application developer acquires a traffic counting plug-in and a help document at first. Here, the traffic plug-in and the help document are generally acquired from a website by the developer.

Step S6024: An application is provided to obtain the application ID. In this step, when hoping to acquire the traffic plug-in to be embedded in the application, the developer needs to provide the application so that the website allocates an application ID at first.

Step S6026: The traffic plug-in and the application ID are embedded in the application. Here, the developer embeds the allocated application ID and the acquired traffic plug-in into the application.

Step S6028: The application is uploaded. Here, the developer uploads the application again, wherein the provided application has been updated.

Step S604: A user side downloads the application, and the network traffic is counted when the application is be used.

Figure 8:
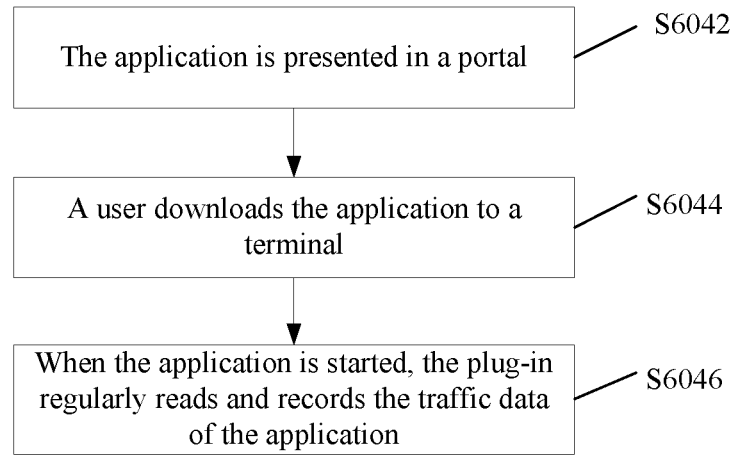
FIG. 8 is flowchart 2 showing the steps of a method for reporting and counting the traffic of a terminal application by a plug-in according to the second example embodiment of the present disclosure.

In the implementation process, the flow of Step S604 may be as shown in FIG. 8, including Steps S6042 to S6046.

Step S6042: The application is presented in a portal. Here, the application is released in the portal for presentation by a common website.

Step S6044: A user downloads the application to a terminal. Here, the user browses the website to download the application to the terminal. The terminal may include but is not limited to a mobile phone, a Personal Computer (PC), a tablet PC, a Set Top Box (STB) or a television.

Step S6046: When the application is started, the plug-in regularly reads and records the traffic data of the application. Here, when the application is started by a user, the plug-in may regularly read and record the traffic data of the application.

When the application is started, the plug-in may read various types of network traffic. For example, the plug-in regularly reads the total bytes received through terminal connection, the total data packets received through terminal connection, total bytes sent by the terminal, total data packets sent by the terminal, total bytes received through the terminal, total data packets received through the terminal, total bytes sent by the terminal, total data packets sent by the terminal, the received bytes for acquiring a network UID by the terminal, and the sent bytes for acquiring a network UID by the terminal.

Step S606: The counted network traffic is reported. A traffic counting plug-in regularly reports the traffic data to a server according to a policy, wherein the reported data may carry data such as IMSI number, application ID, traffic, traffic type (WIFI, 3G, 4G/LTE, broadband and the like).

When the application is started, the plug-in acquires a traffic reporting policy from the server. An interface is defined as follows.

Interface calling direction: mobile phone client->service interface machine. The interface adopts a form of HTML+XML. The request adopts a post way. The request Uniform Resource Locator (URL) is: http://ip:port/servicedata.do?serviceid=UpFlowsRequest, and null data request is acceptable.

For a response, the response message body is given according to Extensive Markup Language (XML) as follows:

```
<?xml version="1.0" encoding="UTF-8"?>
<Response>
  <GetMessageRsp>
    <HRet>XXX</HRet>//0- successful 1-failed
    <Policy>XXX</ Policy >//policy feedback: 1-default policy (1 is
responded unless there are special requirements), 2-cautious policy,
3-careful policy, 4-closing, 5, 6, 7, 8, 9 and 10-undetermined
    <Desc>XXX</ Desc>// report result description
  <GetMessageRsp>
<Response>
```

The description of field in the program above may be as shown in FIG. 1.

TABLE 1

| Parameter name | Mandatory or not | Data type | Description |
|---|---|---|---|
| HRet | Yes | Int | 0- successful 1-failed |
| Policy | Yes | Int | 1-default policy (1 is responded unless there are special requirements), 2-cautious policy, 3-careful policy, 4-closing, 5, 6, 7, 8 . . . -undetermined, for extensions. |
| Dec | Yes | String | Report result description |

When the traffic reporting policy has been acquired, the plug-in reports the traffic according to the traffic reporting policy. An interface is defined as follows.

Interface calling direction: mobile phone client->service interface machine. The interface adopts a form of HTML+XML. The request adopts a post way. The request Uniform Resource Locator (URL) is:

```
http://ip:port/servicedata.do?serviceid=UpFlows.
  The request message body is given according to XML as follows:
  <?xml version="1.0" encoding="UTF-8"?>
  <Request>
    <GetMessageRsp>
      <IMEI>XXX</IMEI>//imei number
      <IMEI>XXX</IMEI>//imei number
        <USERAGENT>XXX</USERAGENT>//mobile phone UA
information
   <InternalIP>XXX</InternalIP>//mobile phone IP information (internal
network IP)
      <POLICY>XXX</POLICY>//traffic counting policy
      <PREASSEMBLE>XXX</PREASSEMBLE>//client version channel
number
        <USERACCOUNT>XXX</USERACCOUNT>//useraccount
        number
        <STARTTIME>XXX</STARTTIME>//start time
        <ENDTIME>XXX</ENDTIME>//end time
    <EXTENDEDDATA1>XXX</ EXTENDEDDATA1>//extended field 1
    <EXTENDEDDATA2>XXX</ EXTENDEDDATA2>//extended field 2
    <EXTENDEDDATA1>XXX</ EXTENDEDDATA1>//extended field 3
    <app>//one request reports the traffic of 200 applications at most (the
case of more than 200 applications is not discussed in this example
embodiment; the reported traffic is sorted according to the traffic volume);
less than 100Kbyte is uploaded every day; and a report is made every
12 hours according to the start time of the server.
        <APPID>XXX</APPID>//application ID
        <APPNAME>XXX</APPNAME>//application name
        <UPLOAD>XXX</UPLOAD>
        <UPLOADTYPE>XXX</UPLOADTYPE>
        <RECEIVE>XXX</RECEIVE>
        <RECEIVETYPE>XXX<RECEIVETYPE>
    <APPChannel>XXX</APPChannel>//application channel number
      </app>
      <app>......</app>
      ......
    </GetMessageReq>
  <Request>
```

In the message body parameters, the description of request parameters may be as shown in Table 2 below.

TABLE 2

| Parameter name | Mandatory or not | Data type | Description |
|---|---|---|---|
| Serviceid | Yes | String | "Upflows" here |
| Imei (international mobile equipment identity) | Yes | String | Mobile phone IMEI number (which is transmitted in step 2 when the policy is policy 1, 2 or 3) |

TABLE 2-continued

| Parameter name | Mandatory or not | Data type | Description |
|---|---|---|---|
| Imsi (international mobile subscriber identity) | Yes | String | Mobile phone IMEI number (which is transmitted in step 2 when the policy is policy 1) |
| userAgent | Yes | String | Mobile phone model UA, leave it blank when it cannot be obtained (it is transmitted in step 2 when the policy is policy 5) |
| IP (Mobile phone IP address) | Yes | String | Mobile phone IP, leave it blank when it cannot be obtained (it is transmitted in step 2 when the policy is policy 1) |
| policy | Yes | int | which is transmitted in step 2 when the policy is policy 1, 2 or 3, and its value is the response in Step S1 |
| preassemble | Yes | string | Client version channel number, see < Android workbench client pre-assembled mark design scheme > for the details of its definition |
| Useraccount | Yes | string | Application store account: mobile phone number/email address (which is transmitted in Step 2 when the policy is policy 1 or 2) |
| appid | Yes | string | Application ID (Which is transmitted when the policy is policy 1) |
| appname | Yes | string | Application name (it is processed exceptionally in case of 3 G/wifi) (which is transmitted in Step 2 when the policy is policies 1, 2 or 3 1 and 2) |
| upload | Yes | string | Uplink traffic (which is transmitted in Step 2 when the policy is policy 1), unit: Byte |
| uploadtype | Yes | string | Uplink traffic type 0-mixed type, 1-wifi, 2-3 g, 3-2 g and 4-others (which is transmitted in Step 2 when the policy is policy 1, for wifi/3 g 1 and 2 are transmitted; and 0 is transmitted when wifi and 3 cannot be distinguished by the specific app |
| receive | Yes | string | Downlink traffic (which is transmitted in Step 2 when the policy is policy 1, 2 or 3), unit: Byte |
| receivetype | Yes | string | Downlink traffic type 0-mixed type, 1-wifi, 2-3 g, 3-2 g and 4-others (which is transmitted in Step S1 when the policy is policy 1; for wifi/3 g, 1 and 2 are transmitted; and 0 is transmitted when wifi and 3 g cannot be distinguished by the specific app) |
| Appchannel | Yes | String | Application channel number |
| starttime | Yes | string | Start time (which is transmitted in Step 2 when the policy is policy 1, 2 or 3) |
| endtime | Yes | string | End time (which is transmitted in Step 2 when the policy is policy 1) |

For a response, the response message body is given according to XML as follows:

```
<?xml version="1.0" encoding="UTF-8"?>
<Response>
    <GetMessageRsp>
        <HRet>XXX</HRet>//0- successful 1-failed
        <Desc>XXX</ Desc >// report result description
    <GetMessageRsp>
<Response>
```

The description of field in the program above may be as shown in FIG. 3.

TABLE 3

| Parameter name | Mandatory or not | Data type | Description |
|---|---|---|---|
| HRet | Yes | Int | 0- successful 1-failed |
| Dec | Yes | String | Report result description |

Figure 9:
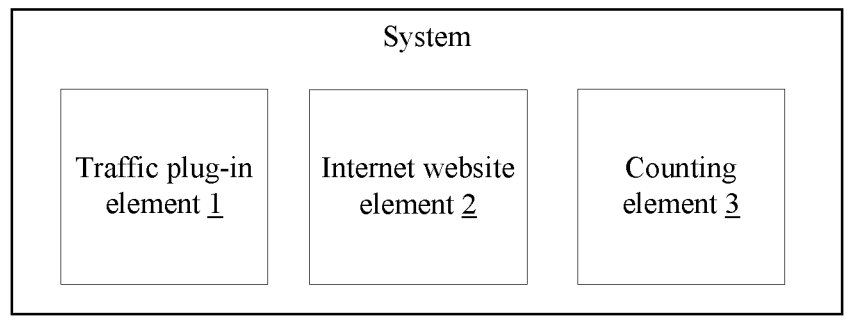
FIG. 9 is diagram showing the structure of a system for reporting and counting the traffic of a terminal application by a plug-in according to the second example embodiment of the present disclosure.

The example embodiment further provides a system for reporting and counting the traffic of application of a terminal through a plug-in. The system may be applied for implementing the above method, as shown in FIG. 9, including the following elements.

A traffic plug-in element 1 is configured to acquire and report application traffic. The traffic plug-in element may further include: a traffic plug-in timer, which triggers a logic element regularly; a traffic plug-in logic element, which determines which policy is adopted to send the traffic and acquire the traffic; and a traffic plug-in interface element, which establishes an interface at a server side and transmits a traffic packet.

An internet website element 2 is configured to provide a traffic plug-in so that the developer can provide an application to be downloaded and used by a terminal user, and to provide a traffic transmission policy (transmitting all the traffics, transmitting imei useraccout appname receive startime+total traffic (wifi/3g), only transmitting total traffic (wifi/3g), closing the transmission of traffic). The internet website element may further include: an application upload portal element, which is configured to provide a traffic plug-in and a help document so that the developer can provide an application with a plug-in; and an application presentation portal element, which is configured to present the application for the download of a terminal user.

A counting element 3 is configured to put the traffic counting data in storage for query and counting.

As can be seen from what is described above, the embodiments of the present disclosure have the following advantages.

Through the embodiments of the present disclosure, the problem that the operator cannot master the traffic demands of application of the user side in different periods so that they cannot carry out operation and management according to the traffic use condition of application of the user side is solved. The operator can master the traffic use condition of application of the user side according to the network traffic reported by the application so as to operate and manage the network traffic according to the traffic use condition of the user, thereby improving the monitoring of the network traffic.

Obviously, those skilled in the art shall understand that the components or steps of the present disclosure may be implemented by general computing apparatus and centralized in a single computing apparatus or distributed in a network consisting of multiple computing apparatus. Optionally, the components or steps may be implemented by program codes executable by the computing apparatus so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. By doing so, the present disclosure is not limited to any specific combination of hardware and software.

The above are only example embodiments of the present disclosure and not intended to limit the present disclosure. For those skilled in the art, the present disclosure may have various modifications and changes. Any modifications, equivalent replacements, improvements and the like within the principle of the present disclosure shall fall within the scope of protection defined by the claims of the present disclosure.

What is claimed is:

1. A method for reporting traffic, comprising:
    acquiring, by a processor running an application, network traffic of the application; and
    reporting, by the processor running the application, the network traffic;
    wherein acquiring, by the processor running the application, the network traffic of the application comprises: acquiring the network traffic of the application according to a first predetermined time; and counting the network traffic of the application in different networks according to a predetermined policy;
    wherein acquiring, by the processor running the application, the network traffic of the application comprises: acquiring, by a plug-in embedded in the processor running the application, the network traffic of the application according to a network type, wherein the plug-in is a plug-in embedded in the application by a website releasing the application.

2. The method according to claim 1, wherein acquiring, by the processor running the application, the network traffic of the application comprises:
    acquiring, by the processor running the application, the network traffic of the application according to a network type.

3. The method according to claim 2, wherein acquiring the network traffic of the application according to the first predetermined time comprises:
    when the application is started, reading the network traffic passing through a terminal according to the first predetermined time, wherein the network traffic at least comprises one of the following: total bytes received/sent through connection, total data packets received/sent through connection, total bytes received/sent, total data packets received/sent and total bytes received/sent for acquiring a network User Identifier, UID.

4. The method according to claim 2, wherein the network type at least comprises one of the following: Wireless Local Area Network, WLAN, mobile cellular network, Long Term Evolution, LTE, and Long Term Evolution-Advanced, LTE-A.

5. The method according to claim 1, wherein acquiring the network traffic of the application according to the first predetermined time comprises:
    when the application is started, reading the network traffic passing through a terminal according to the first predetermined time, wherein the network traffic at least comprises one of the following: total bytes received/sent through connection, total data packets received/sent through connection, total bytes received/sent, total data packets received/sent and total bytes received/sent for acquiring a network User Identifier, UID.

6. The method according to claim 1, wherein the network type at least comprises one of the following: Wireless Local Area Network, WLAN, mobile cellular network, Long Term Evolution, LTE, and Long Term Evolution-Advanced, LTE-A.

7. The method according to claim 1, wherein reporting, by the processor running the application, the network traffic comprises:
    reporting the counted network traffic according to a second predetermined time, wherein the counted network traffic at least carries the following information: International Mobile Subscriber Identifier, IMSI, application identifier, ID, information of the application, and data traffic corresponding to different networks.

8. A method for counting network traffic, comprising:
    acquiring, by a website, an application identifier, ID, of an application;
    embedding, by the website, a plug-in and the application ID into the application, wherein the plug-in is configured to acquire network traffic of the application;
    providing, by the website, to a user the application into which the plug-in and the application ID are embedded; and
    receiving, by the website, the network traffic of the application reported by the plug-in;
    wherein before the website receives the network traffic of the application reported by the pluq-in, the method further comprises: acquiring, by the pluq-in, the network traffic of the application according to a network type;
    wherein acquiring, by the pluq-in, the network traffic of the application according to the network type comprises: acquiring, by the pluq-in, the network traffic of the application according to a first predetermined time; and counting the network traffic of the application in different networks according to a predetermined policy.

9. An apparatus for reporting traffic, comprising a processor coupled to a memory, wherein the processor is configured to execute program components stored on the memory, the program components comprising:
    a first acquisition component, which is configured to acquire network traffic of the application; and
    a reporting component, which is configured to report the network traffic;
    wherein the first acquisition component comprises: an acquisition element, which is configured to acquire the network traffic of the application according to a first predetermined time; and a counting element, which is configured to count the network traffic of the application in different networks according to a predetermined policy;
    wherein the first acquisition component is configured to acquire the network traffic of the application by following steps: acquiring the network traffic of the application according to a network type, wherein the first acquisition component is as a plug-in embedded in the processor running the application, the plug-in is a plug-in embedded in the application by a website releasing the application.

10. An apparatus for counting network traffic, comprising:
    a second acquisition component, which is configured to acquire an application identifier, ID, of an application, an embedding component, which is configured to embed a plug-in and the application ID into the application, wherein the plug-in is configured to acquire network traffic of the application, a presentation component, which is configured to provide to a user the application into which the plug-in and the application ID are embedded, and a receiving component, which is configured to receive the network traffic of the application reported by the plug-in.

* * * * *